(12) United States Patent
Nakai et al.

(10) Patent No.: US 11,697,224 B2
(45) Date of Patent: Jul. 11, 2023

(54) METHOD FOR MANUFACTURING COMPACT

(71) Applicant: SEIKO EPSON CORPORATION, Tokyo (JP)

(72) Inventors: Yoko Nakai, Nagano (JP); Shinobu Yokokawa, Nagano (JP); Hideki Tanaka, Nagano (JP); Naotaka Higuchi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/485,607

(22) Filed: Sep. 27, 2021

(65) Prior Publication Data

US 2022/0097262 A1 Mar. 31, 2022

(30) Foreign Application Priority Data

Sep. 29, 2020 (JP) ................................. 2020-163404

(51) Int. Cl.
| | |
|---|---|
| *D04H 1/587* | (2012.01) |
| *D04H 1/732* | (2012.01) |
| *D04H 1/60* | (2006.01) |
| *B27N 3/00* | (2006.01) |
| *B27N 3/18* | (2006.01) |
| *B29C 43/00* | (2006.01) |

(52) U.S. Cl.
CPC ............ *B29C 43/006* (2013.01); *B27N 3/002* (2013.01); *B27N 3/18* (2013.01); *D04H 1/587* (2013.01); *D04H 1/60* (2013.01); *D04H 1/732* (2013.01)

(58) Field of Classification Search
CPC ............ D04H 1/732; D04H 1/587; D04H 1/60
See application file for complete search history.

(56) References Cited

U.S. PATENT DOCUMENTS

| | | | |
|---|---|---|---|
| 2014/0027075 A1 | 1/2014 | Yamagami et al. | |
| 2015/0251867 A1* | 9/2015 | Higuchi | ................ B65H 20/10 |
| | | | 226/95 |
| 2016/0332325 A1 | 11/2016 | Murayama et al. | |
| 2019/0270220 A1* | 9/2019 | Oguchi | ................ D21G 9/0063 |
| 2019/0352851 A1* | 11/2019 | Kemper | .................... B32B 7/12 |
| 2020/0031090 A1 | 1/2020 | Kurata et al. | |
| 2021/0301467 A1* | 9/2021 | Knowlson | .............. D04H 1/425 |

FOREIGN PATENT DOCUMENTS

| | | |
|---|---|---|
| CN | 106062267 A | 10/2016 |
| CN | 110088396 A | 8/2019 |
| EP | 3112513 A1 | 1/2017 |
| JP | 2012-144826 A | 8/2012 |
| WO | 2018/100904 A1 | 6/2018 |

* cited by examiner

*Primary Examiner* — Mary Lynn F Theisen
(74) *Attorney, Agent, or Firm* — Global IP Counselors, LLP (57) ABSTRACT

A method for manufacturing a compact includes a mixing step of mixing a fiber and a powder of a binder to obtain a mixture; an accumulating step of accumulating the mixture to form a web; a humidifying step of adding water to the web; and a forming step of heating and pressurizing the water-added web to obtain a compact. The binder binds between fiber molecules by the addition of water. The powder has an average particle diameter (D50) of 20.0 μm or less.

5 Claims, 1 Drawing Sheet

METHOD FOR MANUFACTURING COMPACT

The present application is based on, and claims priority from JP Application Serial Number 2020-163404, filed Sep. 29, 2020, the disclosure of which is hereby incorporated by reference herein in its entirety.

BACKGROUND

1. Technical Field

The present disclosure relates to a method for manufacturing a compact.

2. Related Art

As a method for manufacturing a compact, such as paper, a method called a dry method, which uses no or little water, has been expected. For example, JP-A-2012-144826 discloses a method for manufacturing paper by accumulating a mixture of dry fibers and a resin and pressurizing and heating it as a sheet-manufacturing method that can reduce the energy in the drying process because the method does not use a large amount of water unlike a papermaking method.

However, in the method for manufacturing paper described in JP-A-2012-144826, the resin is used as a binder between fibers. If the resin is replaced with a natural material, such as starch, in order to reduce environmental loading, it is necessary to add a relatively large amount of moisture for developing binding properties between fibers.

SUMMARY

An aspect of a method for manufacturing a compact according to the present disclosure includes a mixing step of mixing a fiber and a powder of a binder to obtain a mixture; an accumulating step of accumulating the mixture to form a web; a humidifying step of adding water to the web; and a forming step of heating and pressurizing the water-added web to obtain a compact, wherein the binder binds between fiber molecules by the addition of water; and the powder has an average particle diameter (D50) of 20.0 µm or less.

DESCRIPTION OF EXEMPLARY EMBODIMENTS

Figure 1:
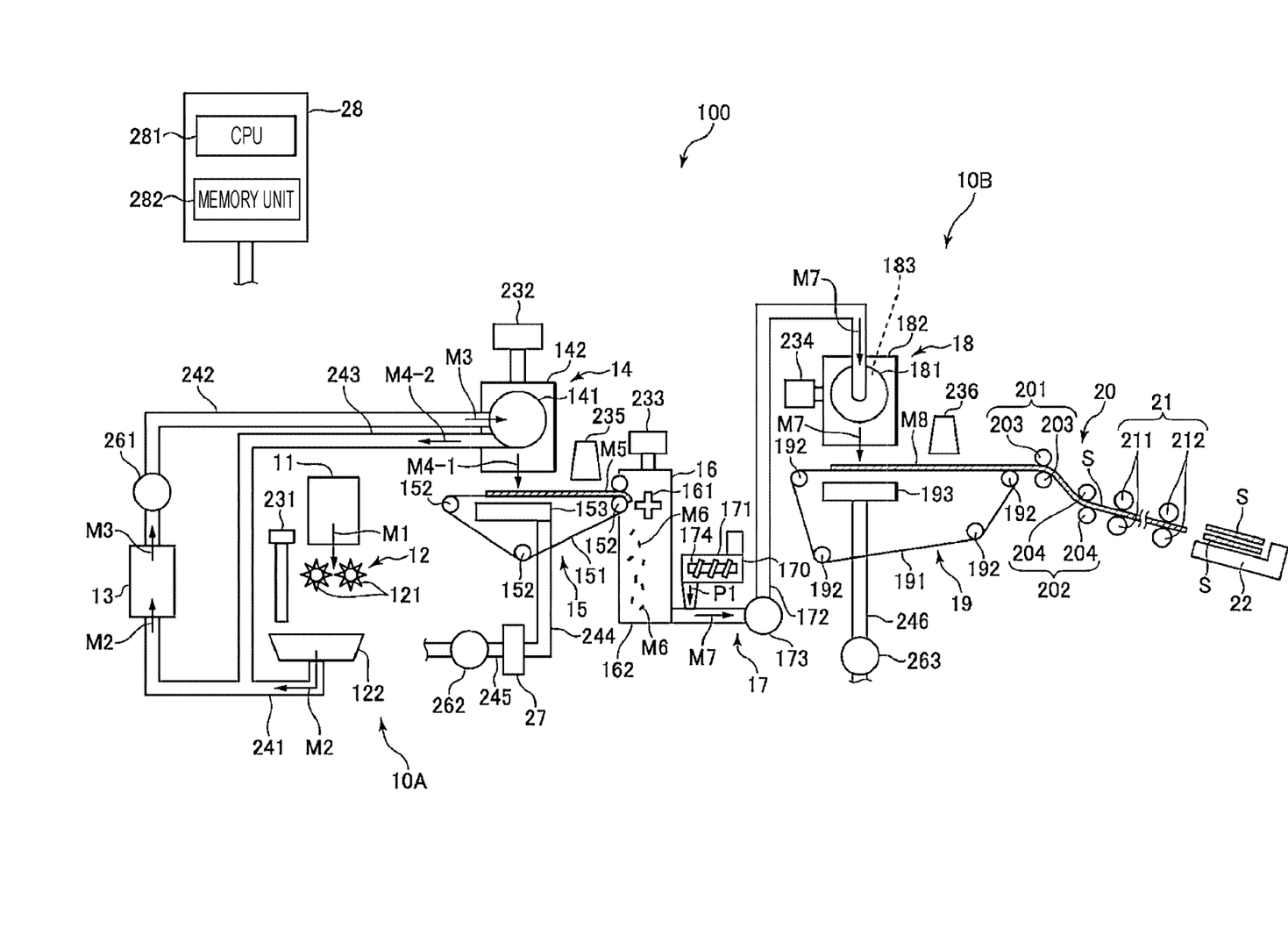
FIG. is a diagram schematically illustrating a compact-manufacturing apparatus according to an embodiment.

Some embodiments of the present disclosure will now be described. The embodiments described below describe examples of the present disclosure. The present disclosure is not limited to the following embodiments, and includes various modifications that are implemented within a range not changing the gist of the present disclosure. Not all of the configurations described later are essential configurations of the present disclosure.

1. Method for Manufacturing Compact

The method for manufacturing a compact according to an embodiment includes a mixing step of mixing a fiber and a powder of a binder to obtain a mixture; an accumulating step of accumulating the mixture to form a web; a humidifying step of adding water to the web; and a forming step of heating and pressurizing the water-added web to obtain a compact. The binder binds between fiber molecules by the addition of water, and the powder has an average particle diameter (D50) of 20.0 µm or less.

1.1. Mixing Step

The method for manufacturing a compact of the present embodiment includes a mixing step. In the mixing step, a fiber and a powder of a binder are mixed.

1.1.1. Fiber

The fiber is a main component of the compact that is manufactured using the mixture, highly contributes to retention of the shape of the compact, and is one of components for expressing the characteristics, such as the strength, of the compact.

The fiber may be made of a material having at least one chemical structure selected from a hydroxy group, a carbonyl group, and an amino group. Consequently, a hydrogen bond is easily formed between the fiber and a binder described later, and the bond strength between the fiber and the binder and the strength as the whole compact manufactured using the mixture, for example, the tensile strength of a sheet-like compact, can be further improved.

Although the fiber may be a synthetic fiber constituted of a synthetic resin, such as polypropylene, polyester, or polyurethane, the fiber may be a natural fiber, i.e., a biomass-derived fiber or a cellulose fiber. Consequently, it is possible to respond more appropriately to, for example, environmental problems and saving of underground resources. In particular, when the fiber is a cellulose fiber, the following effects are also obtained.

That is, cellulose is an abundant natural material derived from plants, and the use of cellulose as a fiber constituting a mixture can further appropriately respond to, for example, environmental problems and saving of underground resources. In addition, cellulose may be used from the viewpoint of stable supply, cost reduction, etc. of the mixture and the compact manufactured using the mixture. In addition, the theoretical strength of a cellulose fiber is particularly high among various types of fibers, and a cellulose fiber is advantageous also from the viewpoint of further improving the strength of the compact. Furthermore, a cellulose fiber has good biodegradability.

The fiber may include a component other than cellulose. Examples of the component include hemicellulose and lignin. In addition, as the cellulose fiber, a cellulose fiber subjected to treatment, such as bleaching, may be used.

In addition, the fiber may be one subjected to treatment, such as ultraviolet irradiation treatment, ozone treatment, or plasma treatment. Consequently, the hydrophilicity of the fiber can be increased, and the affinity with the binder can be increased. More specifically, a functional group, such as a hydroxyl group, can be introduced to the surface of the fiber by such treatment, and a hydrogen bond can be more efficiently formed with the binder.

The mixture obtained in this step includes a fiber and a binder. In the mixture, the binder may be adhering to the fiber, and the fiber to which the binder is not adhering may be present. In addition, in the mixture, the binder may be adhering to the fiber, and the binder not adhering to the fiber may be included.

The average length of the fiber is not particularly limited, and may be 0.1 mm or more and 50 mm or less, 0.2 mm or more and 5.0 mm or less, or 0.3 mm or more and 3.0 mm or less.

Consequently, the stability, strength, and so on of the shape of the compact manufactured using the mixture can be further improved.

The average thickness of the fiber is not particularly limited, and may be 0.005 mm or more and 0.5 mm or less or 0.010 mm or more and 0.05 mm or less.

Consequently, the stability, strength, and so on of the shape of the compact manufactured using the mixture can be further improved. In addition, occurrence of undesirable unevenness on the surface of the compact manufactured using the mixture can be prevented.

The average aspect ratio of the fiber, i.e., the ratio of the average length to the average thickness is not particularly limited, and may be 10 or more and 1000 or less or 15 or more and 500 or less.

Consequently, the stability, strength, and so on of the shape of the compact manufactured using the mixture can be further improved. In addition, occurrence of undesirable unevenness on the surface of the compact manufactured using the mixture can be prevented.

The content proportion of the fiber in the mixture is not particularly limited, and may be 60.0 mass % or more and 99.0 mass % or less, 85.0 mass % or more and 98.0 mass % or less, or 88.0 mass % or more and 97.0 mass % or less.

Consequently, the characteristics, such as the stability and the strength, of the shape of the compact manufactured using the mixture can be further improved. In addition, the formability when the compact is manufactured can be further improved, which is advantageous for also improving the productivity of the compact.

1.1.2. Binder

The binder is a component that functions as a binder for binding the fiber molecules in the compact manufactured using the mixture. In particular, the binder can be derived from biomass and can respond appropriately to, for example, environmental problems and saving of underground resources. In addition, the adhesion can be exhibited at a relatively low temperature by a small amount of moisture relative to the amount of the binder, and excellent binding properties can be obtained.

As the binder, for example, starch, dextrin, glycogen, amylose, hyaluronic acid, kudzu, konjac, dogtooth violet starch, etherified starch, esterified starch, natural gum paste (etherified tamarind gum, etherified locust bean gum, etherified guar gum, and acacia Arabic gum), fiber-induced paste (etherified carboxymethylcellulose and hydroxyethyl cellulose), seaweeds (sodium alginate and agar), and animal protein (collagen, gelatin, hydrolyzed collagen, and sericin) can be used, and an arbitrary mixture thereof may be used.

In addition, among these binders, the binder may be at least one of starch and dextrin or may be dextrin or a mixture of dextrin and starch in which the ratio of the dextrin is high. In contrast, in terms of making the powder relatively insoluble in moisture and making the binder easy to handle, the binder may be starch or may be a mixture of dextrin and starch in which the ratio of the starch is high. When at least one of starch and dextrin is used as the binder, the coloring is low, the adjustment of the average particle diameter of the powder is also more easy, and the acquisition is also relatively easy.

Starch and dextrin are polymer materials obtained by polymerization of a plurality of α-glucose molecules through glycoside bonds. The starch and the dextrin may be each a straight chain or may each include a branch.

As the starch and the dextrin, starch and dextrin derived from a variety of plants can be used. Examples of the raw materials of starch and dextrin include cereals, such as corn, wheat, and rice; beans, such as broad bean, mung bean, and adzuki bean; potatoes, such as potato, sweet potato, and tapioca; wild grasses, such as dogtooth violet, bracken, and kudzu; and palms, such as sago palm.

In addition, as the starch, processed starch or modified starch may be used. Examples of the processed starch include acetylated distarch adipate, acetylated starch, oxidized starch, starch sodium octenylsuccinate, hydroxypropyl starch, hydroxypropyl distarch phosphate, phosphated starch, phosphated esterified distarch phosphate, urea phosphates esterified starch, sodium glycolate starch, and high-amylose corn starch. Examples of the modified starch include α starch, modified dextrin, lauryl polyglucose, cationized starch, thermoplastic starch, and carbamate starch.

The dextrin may be a commercially available one. For example, dextrins distributed under the names of Dextrol, Yellow dextrin, A-sol, Enzyme-modified dextrin, and British gum can be suitably used.

The binder is mixed in a powder form. A binder in a powder form can be uniformly mixed with fibers in a mixing step. The size of particles of the binder powder is 20.0 μm or less as the volume-based average particle diameter D50. The average particle diameter (D50) of the binder powder may be 18.0 μm or less, 15.0 μm or less, or 10.0 μm or less. When the average particle diameter (D50) of the powder is within this range, better mixing with fibers is obtained. In contrast, the lower limit of the average particle diameter (D50) of the binder powder is not particularly limited, and may be 0.5 μm or more, 1.0 μm or more, or 1.5 μm or more. When the lower limit of the average particle diameter (D50) is within this range, the handling of the binder in a powder form is more easy, and the manufacturing by, for example, pulverization is also more easy.

When the average particle diameter of the binder powder is within the above-mentioned range, since the particles of the powder are small, when the binder that can bind fiber molecules by addition of moisture is supplied in a powder form to a web, the added moisture easily penetrates into the powder. Accordingly, the manufacturing of a compact through a dry process can be easily performed even with a small amount of moisture. In addition, consequently, the load on the environment can be reduced by using a natural binder, and the amount of energy that is consumed for removing moisture can be reduced.

1.1.3. Mixture

By going through the present step, at least, a fiber and a powder of a binder are mixed to provide a mixture. The content proportion of the binder with respect to the total amount of the mixture may be 1.0 mass % or more and 30.0 mass % or less, 2.0 mass % or more and 28.0 mass % or less, or 3.0 mass % or more and 25.0 mass % or less.

In addition, the web that is formed in the accumulating step described later is formed by the mixture. Accordingly, the content of the binder with respect to the total amount of the web may be 1.0 mass % or more and 30.0 mass % or less, 2.0 mass % or more and 28.0 mass % or less, or 3.0 mass % or more and 25.0 mass % or less as in the mixture.

When the content proportion of the binder in the mixture or the web is within the range above, the web contains a sufficient amount of the binder, and, for example, the web can be stably transported during the manufacturing process.

Incidentally, the content proportion of the binder can be measured by component analysis, such as thermogravimetry or an NMR method, and can be measured using pretreatment, such as enzymatic decomposition, as needed.

The mixture may include a component other than the above-described fiber and binder. Examples of such the additional component include a sizing agent, impurities derived from the fiber, and impurities derived from the binder. In addition, the mixture may include a component for imparting desired performance to a compact to be formed described later. Examples of such the additional component include a filler, such as calcium carbonate, talc, titanium oxide, silica, and diatomaceous earth; a coloring material, such as a pigment, a dye, and a toner; and paper strength enhancer, such as polyvinyl alcohol (PVA).

However, the content proportion of the components other than the fiber and the binder in the mixture may be limited to 10 mass % or less, 5.0 mass % or less, or 2.0 mass % or less.

1.2. Accumulating Step

The method for manufacturing a compact of the present embodiment includes an accumulating step of accumulating the mixture to form a web. The accumulating step is a step of making the mixture fall and accumulate on a suitable material. In the accumulating step, a web can be further easily formed by, for example, making the mixture fall on a mesh through which air passes. Furthermore, the accumulating step can form a continuous web by, for example, using a mesh belt of a manufacturing apparatus described later.

1.3. Humidifying Step

The method for manufacturing a compact of the present embodiment includes a humidifying step of adding water to a web. Part or the whole of the surface of the binder is provided with adhesion to the fiber by adding moisture to the web in the humidifying step and can adhere to the fiber.

In addition, when the web is humidified by the humidifying step, the bond strength between the fiber and the binder and the bond strength between fiber molecules through the binder can be improved in the forming step described later, and the finally obtained compact can have sufficiently excellent strength and so on. In addition, forming in the forming step can be suitably performed at a relatively low temperature by humidifying the web by the humidifying step.

The method for humidifying the web is not particularly limited, and may be performed in a manner of non-contact with the web, for example, by a method of putting the web in a high humidity environment, a method of allowing the web to pass through a high humidity space, a method of spraying mist of liquid containing water to the web, or a method of allowing the web to pass through a space in which mist of liquid containing water is floating. These methods may be performed alone or in combination of two or more thereof. Incidentally, the liquid containing water may contain, for example, a preservative, a fungicide, or a pesticide.

The humidification of the web may be performed, for example, in multiple steps in the process of manufacturing a compact. More specifically, for example, moisture may be added to the web by at least one of humidification of a raw material of the mixture, humidification of the mixture, and humidification of the web. Furthermore, a combination of these procedures may be performed a plurality of times.

As described above, when humidification of the web or a raw material thereof is performed in multiple steps in the process of manufacturing a compact, for example, there is no need to unnecessarily increase the amount of humidification in each step. As a result, for example, the transportation speed of the mixture or the web in the compact-manufacturing apparatus can be increased to further improve the productivity of the compact.

The amount of moisture that is added to the raw material, the mixture, and the web in the humidifying steps is not particularly limited, and the moisture content of the web at the time of completion of the humidifying step, that is, the moisture content of the web with respect to the total mass of the web at the time of completion of the humidifying step, may be 5.0 mass % or more and 60.0 mass % or less, 7.0 mass % or more and 50.0 mass % or less, or 10.0 mass % or more and 40.0 mass % or less. The method for manufacturing a compact of the present embodiment can perform the manufacturing of a compact through a dry process with such a small amount of moisture. In addition, consequently, the amount of energy that is consumed for removing moisture can be further reduced.

Incidentally, the moisture content can be obtained by measurement using, for example, a heat drying type moisture meter manufactured by A&D Co., Ltd.

1.4. Forming Step

The method for manufacturing a compact of the present embodiment includes a forming step of heating and pressurizing the water-added web to obtain a compact. In the forming step, the humidified web is heated and pressurized and is formed into a sheet, board, or plate shape. Consequently, a compact in which fiber molecules are bound to each other by the binder is obtained. Incidentally, the humidifying step and the forming step may be performed simultaneously.

The heating temperature in the forming step is not particularly limited, and may be 50° C. or more and 100° C. or less, 55° C. or more and 95° C. or less, or 60° C. or more and 90° C. or less. Here, the heating temperature is the surface temperature of the compact. The heating in the forming step is performed, for example, with heating rollers. In such a case, the temperature immediately after the web comes out of the rollers corresponds to the heating temperature, and the temperature of the heating rollers is set such that the surface temperature of the compact becomes the above-mentioned temperature. Incidentally, when the heating is performed with heating rollers, the surface temperature of the compact is adjusted considering the set temperature of the heating rollers and the transportation speed of the web.

By going through the forming step, the adhesiveness of the binder subjected to the humidifying step can be sufficiently obtained. In addition, since moisture is not excessively added to the web by the humidifying step, the temperature of the forming step can be also set low, and consequently the constituent materials of the compact can be suppressed from deteriorating. In addition, consequently, since the amount of moisture to be evaporated is decreased, such a forming step may be adopted from the viewpoint of energy saving. In addition, by going through the forming step, a compact having excellent mechanical strength can be obtained. Incidentally, the temperature mentioned above is a sufficiently lower temperature than that when a synthetic resin, such as polyester, is used as a binder.

The pressurization in the forming step may be performed at 0.1 MPa or more and 100 MPa or less or 0.3 MPa or more and 20 MPa or less. This step can be performed using, for example, a heat press or a heat roller. The order of performing the pressurization and the heating in the forming step is not particularly limited. In addition, the pressurization and the heating in the forming step may be each independently performed multiple times as needed.

1.5. Compact

The compact manufactured by the manufacturing method of the present embodiment is a compact having a desired shape obtained while suppressing the use of a material derived from petroleum. In addition, such a compact also has excellent biodegradability. Furthermore, such a compact also has excellent recyclability, strength, and so on.

The shape of the compact is not particularly limited, and may be any shape, such as a sheet-like, block-like, spherical, or three-dimensional shape. However, since the compact is formed by heating and pressurizing a web, the compact may be in a sheet-like, board-like, or plate-like shape. Incidentally, the term "sheet-like" here refers to a compact formed so as to have a thickness of 30 μm or more and 30 mm or less and a density of 0.05 g/cm$^3$ or more and 1.5 g/cm$^3$ or less. Consequently, for example, the compact can be suitably used as, for example, a recording medium. In addition, the compact can be more efficiently manufactured by using a manufacturing apparatus as described later.

The compact may be at least partially constituted of the mixture described above, and may include a portion that is not constituted of the mixture. The use of the compact is not particularly limited, and examples thereof include a recording medium, a liquid absorber, a buffer material, and an acoustic material. In addition, the compact after the forming step may be subjected to machining such as cutting or various chemical treatment before use.

When the compact is a liquid absorber, the thickness thereof may be 0.3 mm or more and 30 mm or less. In addition, the density may be 0.05 g/m$^3$ or more and 0.4 g/m$^3$ or less. Consequently, the compact can be suitably used as a liquid absorber. In addition, the compact can be more efficiently manufactured by using the manufacturing apparatus as described later.

1.6. Other Step

The method for manufacturing a compact of the present embodiment may include, for example, a preparation step and processing step, in addition to the above-described mixing step, accumulating step, humidifying step, and forming step.

The preparation step is a step of preparing materials to be mixed before the mixing step. Examples of the preparation step include a fiberization step of preparing fibers and a pulverization step of obtaining a binder in a powder form.

The fiberization step includes, for example, obtaining fibers through defibration of a cellulose raw material by a dry process or obtaining fibers through defiberization of a cellulose raw material in water. The fiberization step may obtain fibers through defibration by a dry process because the mixing step is performed by a dry process. The defibration can be performed, for example, in the defibration section of the manufacturing apparatus described later.

The pulverization step can be performed by a known procedure and can use, for example, a known apparatus, such as an FM mixer, a Henschel mixer, a super mixer, or a Nano Jetmizer. The apparatus may be one that performs pulverization by a blade rotating at a high speed or one that uses the rotation of the container, such as a V-type mixer. Furthermore, the apparatus may be a batch apparatus or a continuous apparatus.

2. Compact-Manufacturing Apparatus

The compact-manufacturing apparatus that can be suitably applied to the method for manufacturing a compact will now be described. FIGURE is a schematic side view showing a suitable example of the compact-manufacturing apparatus.

Incidentally, in the following, the upper side of FIGURE may be referred to as "upper" or "upper portion", and the lower side may be referred to as "lower" or "lower portion". In addition, FIGURE is a schematic configuration diagram, and the positional relationship of each section of the compact-manufacturing apparatus 100 may be different from the actual positional relationship. In addition, in FIGURE, the direction in which the fiber raw material M1, coarse fragment M2, defibrated material M3, first sorted material M4-1, second sorted material M4-2, first web M5, subdivided material M6, mixture M7, second web M8, and sheet S are transported, i.e., the direction indicated by arrows, is also referred to as a transportation direction. The tip side of the arrow is also referred to as the downstream in the transportation direction, and the base end side of the arrow is also referred to as the upstream in the transportation direction.

The compact-manufacturing apparatus 100 shown in FIGURE is an apparatus that coarsely crushes and defibrates a fiber raw material M1 to obtain fibers (defibrated material M3), mixes the fibers and a binder in a mixing section 17, accumulates the mixture, and forms this accumulated product, referred to as a second web M8, into a sheet S as a compact by a formation section 20.

As the fiber raw material M1, for example, used paper or waste-paper that is no longer needed can be used. Alternatively, for example, as the fiber raw material M1, a sheet material including a fiber and a binder adhering to the fiber may be used. The sheet material, for example, may be recycled paper obtained by treating waste-paper as a raw material so as to be usable again, or may be non-recycled paper.

The compact-manufacturing apparatus 100 shown in FIGURE includes a sheet supply device 11, a coarse crushing section 12, a defibration section 13, a sorting section 14, a first web-forming section 15, a subdivision section 16, a mixing section 17, a dispersion section 18, a second web-forming section 19, a formation section 20, a cutting section 21, a stock section 22, a collecting section 27, and a controller 28 that controls the operation thereof. The coarse crushing section 12, the defibration section 13, the sorting section 14, the first web-forming section 15, the subdivision section 16, the mixing section 17, the dispersion section 18, the second web-forming section 19, the formation section 20, the cutting section 21, and the stock section 22 are respectively processing sections for processing the sheet.

The sheet supply device 11 and the coarse crushing section 12 or the defibration section 13 constitute a sheet-processing device 10A. The sheet-processing device 10A and the second web-forming section 19 constitute a fiber material accumulation device 10B.

The compact-manufacturing apparatus 100 includes a humidifying section 231, a humidifying section 232, a humidifying section 233, a humidifying section 234, a humidifying section 235, and a humidifying section 236. In addition, the compact-manufacturing apparatus 100 includes a blower 261, a blower 262, and a blower 263.

The humidifying sections 231 to 236 and the blowers 261 to 263 are electrically coupled to the controller 28, and the operations thereof are controlled by the controller 28. That is, the configuration in the present embodiment is that one controller 28 controls the operation of each section of the compact-manufacturing apparatus 100. However, the configuration is not limited thereto, and, for example, it may be a configuration that includes a controller that controls the operation of each section of the sheet supply device 11 and a controller that controls the operation of sections other than the sheet supply device 11.

The compact-manufacturing apparatus 100 performs a raw material supplying step, a coarse crushing step, a defibrating step, a sorting step, a first web-forming step, a segmentation step, a mixing step, a discharging step, an accumulating step, a sheet-forming step, and a cutting step. The sheet-forming step corresponds to the forming step in the method for manufacturing a compact. In addition, a step of performing humidification in each humidifying section described in detail later corresponds to the humidifying step.

The configuration of each section will now be described. The sheet supply device 11 is a portion where the raw material supplying step of supplying the fiber raw material M1 to the coarse crushing section 12 is performed. As the fiber raw material M1, a material including a cellulose fiber as the fiber is used. For example, the compact manufactured by the manufacturing method of the present embodiment may be used.

The coarse crushing section 12 is a portion where the coarse crushing step of coarsely crushing the fiber raw material M1 supplied from the sheet supply device 11 in the air, for example, in the atmosphere is performed. The coarse crushing section 12 includes a pair of crushing blades 121 and a chute 122.

The pair of crushing blades 121 rotate in the opposite direction to each other and thereby coarsely crush the fiber raw material M1 therebetween, that is, can cut the fiber raw material M1 into coarse fragments M2. The coarse fragments M2 can have a shape and a size suitable for defibration treatment in the defibration section 13, and may be, for example, small pieces with a side length of 100 mm or less or small pieces with a side length of 10 mm or more and 70 mm or less.

The chute 122 is disposed under the pair of crushing blades 121, and may have, for example, a funnel-like shape. Consequently, the chute 122 can receive the coarse fragments M2 coarsely crushed by and fell from the crushing blades 121.

In addition, above the chute 122, a humidifying section 231 is disposed adjoining the pair of crushing blades 121. The humidifying section 231 humidifies the coarse fragments M2 in the chute 122. This humidifying section 231 is constituted of a vaporizing humidifier that includes a filter impregnated with moisture and supplies humidified air with increased humidity to the coarse fragments M2 by allowing the air to pass through the filter. The humidifying step described above can be performed by supplying the humidified air to the coarse fragments M2, and the above-described effects can be obtained. In addition, adhesion of the coarse fragments M2 to the chute 122, etc. by static electricity can be prevented.

The chute 122 is coupled to the defibration section 13 via a tube 241. The coarse fragments M2 collected in the chute 122 pass through the tube 241 and are transported to the defibration section 13.

The defibration section 13 is a portion where the defibrating step of defibrating the coarse fragments M2 in the air, i.e., by a dry process is performed. A defibrated material M3 can be generated from the coarse fragments M2 by this defibration treatment in the defibration section 13. Here, the term "defibrate" refers to that a coarse fragment M2 formed by binding a plurality of fiber molecules is disentangled into individual fiber molecules. This disentangled product is referred to as the defibrated material M3. The shape of the defibrated material M3 is linear or strip-like. The defibrated material M3 may exist in a state of being intertwined and agglomerated, that is, in a state of forming a so-called "lump".

The defibration section 13 is, for example, in the present embodiment, constituted of an impeller mill including a rotary blade that rotates at a high speed and a liner that is located on the outer periphery of the rotary blade. The coarse fragments M2 that has flew into the defibration section 13 are sandwiched between the rotary blade and the liner and are defibrated.

In addition, the defibration section 13 can generate a flow of the air toward the sorting section 14 from the coarse crushing section 12, i.e., an air flow, by the rotation of the rotary blade. Consequently, the coarse fragments M2 can be sucked from the tube 241 to the defibration section 13. In addition, after the defibration treatment, the defibrated material M3 can be sent to the sorting section 14 via a tube 242.

The blower 261 is installed in the middle of the tube 242. The blower 261 is an air flow generator that generates an air flow toward the sorting section 14. Consequently, delivery of the defibrated material M3 to the sorting section 14 is accelerated.

The sorting section 14 is a portion where the sorting step of sorting the defibrated material M3 based on the length of the fiber is performed. In the sorting section 14, the defibrated material M3 is sorted into a first sorted material M4-1 and a second sorted material M4-2 that is larger than the first sorted material M4-1. The first sorted material M4-1 has a size suitable for manufacturing of a sheet S that is performed subsequently. The average length thereof may be 1 µm or more and 30 µm or less. On the other hand, the second sorted material M4-2 includes, for example, insufficiently defibrated fiber and excessively aggregated defibrated fiber molecules.

The sorting section 14 includes a drum section 141 and a housing section 142 for accommodating the drum section 141.

The drum section 141 is constituted of a cylindrical net and is a funnel that rotates around the central axis. The defibrated material M3 flows into the drum section 141. The defibrated material M3 smaller than the opening of the net is sorted as the first sorted material M4-1 by the rotation of the drum section 141, and the defibrated material M3 larger than the opening of the net is sorted as the second sorted material M4-2. The first sorted material M4-1 falls from the drum section 141.

On the other hand, the second sorted material M4-2 is sent to a tube 243 coupled to the drum section 141. The tube 243 is coupled to the tube 241 on the opposite side to the drum section 141, i.e., on the upstream. The second sorted material M4-2 passed through the tube 243 joins the coarse fragments M2 in the tube 241 and flows into the defibration section 13 together with the coarse fragments M2. Consequently, the second sorted material M4-2 returns to the defibration section 13 and is subjected to defibration treatment together with the coarse fragments M2.

The first sorted material M4-1 fell from the drum section 141 falls, while dispersing in the air, toward the first web-forming section 15 that is located under the drum section 141. The first web-forming section 15 is a portion where the first web-forming step of forming a first web M5 from the first sorted material M4-1 is performed. The first web-forming section 15 includes a mesh belt 151, three stretching rollers 152, and an aspirator 153.

The mesh belt 151 is an endless belt, and the first sorted material M4-1 accumulates thereon. The mesh belt 151 is put around the three stretching rollers 152, and the first sorted material M4-1 on the mesh belt 151 is transported to the downstream by the rotary drive of the stretching rollers 152.

The first sorted material M4-1 has a size larger than the opening of the mesh belt 151. Consequently, the first sorted material M4-1 is restricted from passing through the mesh belt 151 and thereby can accumulate on the mesh belt 151. In addition, the first sorted material M4-1 is transported to the downstream by the mesh belt 151, while accumulating on the mesh belt 151, and is thereby formed into a layered first web M5.

In the first sorted material M4-1, for example, dust and dirt may be mixed therein. Dust and dirt may be produced by, for example, coarse crushing or defibration. Such dust and dirt are collected in the collecting section 27.

The aspirator 153 is a suction mechanism that sucks air from a position under the mesh belt 151. Consequently, the dust and dirt passed through the mesh belt 151 can be sucked together with the air.

The aspirator 153 is coupled to the collecting section 27 via a tube 244. The dust and dirt sucked by the aspirator 153 are collected in the collecting section 27.

A tube 245 is further coupled to the collecting section 27. A blower 262 is installed in the middle of the tube 245. The suction force is generated in the aspirator 153 by operating the blower 262. Consequently, the formation of the first web M5 on the mesh belt 151 is accelerated. In this first web M5, dust, dirt, and so on are removed. Dust and dirt pass through the tube 244 by the operation of the blower 262 and reach the collecting section 27.

The housing section 142 is coupled to a humidifying section 232. The humidifying section 232 is constituted of a vaporizing humidifier. Consequently, humidified air is supplied in the housing section 142. The above-described humidifying step can be performed by this humidified air, and the effects described above can be obtained. In addition, the first sorted material M4-1 can be humidified and thereby can be prevented from adhering to the inner wall of the housing section 142 by static electricity.

A humidifying section 235 is disposed on the downstream of the sorting section 14. The humidifying section 235 is constituted of an ultrasonic humidifier that sprays water. Consequently, moisture can be supplied to the first web M5, the above-described humidifying step can be performed, and the effects described above can be obtained. In addition, adsorption of the first web M5 to the mesh belt 151 by static electricity can be prevented. Consequently, the first web M5 is easily detached from the mesh belt 151 at the position where the mesh belt 151 is folded back by the stretching roller 152.

The subdivision section 16 is disposed on the downstream of the humidifying section 235. The subdivision section 16 is a portion where the segmentation step of segmenting the first web M5 detached from the mesh belt 151 is performed. The subdivision section 16 includes a propeller 161 rotatably supported and a housing section 162 for accommodating the propeller 161. The first web M5 can be segmented by the rotating propeller 161. The segmented first web M5 is the subdivided material M6. The subdivided material M6 goes down in the housing section 162.

The housing section 162 is coupled to a humidifying section 233. The humidifying section 233 is constituted of a vaporizing humidifier. Consequently, humidified air is supplied in the housing section 162. This humidifying step can be performed with the humidified air, and the effects described above can be obtained. In addition, adhesion of the subdivided material M6 to the propeller 161 and the inner wall of the housing section 162 by static electricity can be prevented.

The mixing section 17 is disposed on the downstream of the subdivision section 16. The mixing section 17 is a portion where the mixing step of mixing the subdivided material M6 and a binder P1 is performed. This mixing section 17 includes an additive feeding section 171, a tube 172, and a blower 173.

The tube 172 is a channel coupling between the housing section 162 of the subdivision section 16 and the housing 182 of the dispersion section 18, and a mixture M7 of the subdivided material M6 and the binder P1 passes therethrough.

The additive feeding section 171 is coupled in the middle of the tube 172. The additive feeding section 171 includes a housing section 170 accommodating the binder P1 and a screw feeder 174 provided in the housing section 170. The binder P1 in the housing section 170 is extruded from the housing section 170 by the rotation of the screw feeder 174 and is supplied in the tube 172. The binder P1 supplied in the tube 172 is mixed with the subdivided material M6 to give a mixture M7.

Here, the binder P1 supplied from the additive feeding section 171 may be mixed with, for example, a coloring agent for coloring the fiber, an aggregation inhibitor for suppressing aggregation of the fiber, a flame retardant for making the fiber, etc. hard to burn, a paper strength enhancer for reinforcing the paper strength of the sheet S, and a defibrated material, and one or a combination of two or more thereof may be used.

It is possible to make the binder P1 adhere to the fiber constituting a sheet S with high uniformity by supplying the binder P1 from the additive feeding section 171. That is, since the powder of the binder P1 has a small average particle diameter, unevenness in the composition of the mixture, variation in the composition of the sheet S as a finally obtained compact, and so on can be suppressed, and the reliability of the sheet S can be further improved.

In addition, the blower 173 is installed in the middle of the tube 172 on the downstream than the additive feeding section 171. The action of the rotating portion, such as a blade, included in the blower 173 accelerates mixing of the subdivided material M6 and the binder P1. In addition, the blower 173 can generate an air flow toward the dispersion section 18. It is possible to stir the subdivided material M6 and the binder P1 in the tube 172 by this air flow. Consequently, the mixture M7 is transported to the dispersion section 18 in a state in which the subdivided material M6 and the binder P1 are uniformly dispersed. The subdivided material M6 in the mixture M7 is disentangled in the process of passing through the tube 172 and becomes a finer fibrous form.

Incidentally, as shown in FIGURE, the blower 173 is electrically coupled to the controller 28, and the operation thereof is controlled. In addition, the amount of air to be sent into the drum 181 can be controlled by controlling the air flow rate of the blower 173.

Incidentally, although it is not shown, the tube 172 diverges into two at the end on the drum 181 side, and the diverged ends are respectively coupled to introduction ports (not shown) formed in the end faces of the drum 181.

The dispersion section 18 shown in FIGURE is a portion where the discharging step of disentangling the intertwined fiber molecules in the mixture M7 and discharging them is performed. The dispersion section 18 includes a drum 181 that introduces and discharges the mixture M7, which is a defibrated material, a housing 182 for accommodating the drum 181, and a driving source 183 for rotary driving of the drum 181.

The drum 181 is constituted of a cylindrical net and is a funnel that rotates around the central axis. The fiber and so on of the mixture M7 smaller than the opening of the net can pass through the drum 181 by the rotation of the drum 181. On this occasion, the mixture M7 is disentangled and is discharged together with air. That is, the drum 181 functions as a discharge section that discharges a material including the fiber.

The driving source 183 includes a motor, a speed reducer, and a belt (not shown). The motor is electrically coupled to the controller 28 via a motor driver. The rotary power output from the motor is decreased by the speed reducer. The belt is constituted of, for example, an endless belt, and is put around the output shaft of the speed reducer and the outer periphery of the drum. Consequently, the rotary power of the output shaft of the speed reducer is transmitted to the drum 181 via the belt.

The housing 182 is coupled to a humidifying section 234. The humidifying section 234 is constituted of a vaporizing humidifier. Consequently, humidified air is supplied in the housing 182. The inside of the housing 182 can be humidified by this humidified air, the humidifying step can be performed, and the effects described above can be obtained. In addition, adhesion of the mixture M7 to the inner wall of the housing 182 by static electricity can also be prevented.

The mixture M7 discharged from the drum 181 falls, while dispersing in the air, toward the second web-forming section 19 located under the drum 181. The second web-forming section 19 is a portion where the accumulating step of forming a second web M8, which is an accumulated product formed by accumulating the mixture M7, is performed. The second web-forming section 19 includes a mesh belt 191, stretching rollers 192, and an aspirator 193.

The mesh belt 191 is a mesh member and is constituted of an endless belt in the configuration shown in the drawing. The mixture M7 dispersed and discharged by the dispersion section 18 accumulates on the mesh belt 191. This mesh belt 191 is put around the four stretching rollers 192, and the mixture M7 on the mesh belt 191 is transported to the downstream by the rotary drive of the stretching rollers 192.

Incidentally, in the configuration shown in the drawing, the mesh belt 191 is used as one example of the mesh member, but the present disclosure is not limited thereto. For example, a tabular member may be used.

Almost all of the mixture M7 on the mesh belt 191 has a size larger than the opening of the mesh belt 191. Consequently, the mixture M7 is restricted from passing through the mesh belt 191 and thereby can accumulate on mesh belt 191. In addition, the mixture M7 is transported to the downstream by the mesh belt 191, while accumulating on the mesh belt 191, and is thereby formed into a layered second web M8.

The aspirator 193 is a suction mechanism that sucks air from the lower portion of the mesh belt 191. Consequently, the mixture M7 can be sucked on the mesh belt 191, and thereby accumulation of the mixture M7 on the mesh belt 191 is accelerated.

A tube 246 is coupled to the aspirator 193. In addition, a blower 263 is installed in the middle of the tube 246. Suction force is generated in the aspirator 193 by the operation of the blower 263.

A humidifying section 236 is disposed on the downstream of the dispersion section 18. The humidifying section 236 is constituted of an ultrasonic humidifier as in the humidifying section 235. Consequently, moisture can be supplied to the second web M8, and thereby the humidifying step can be performed, and the effects described above can be obtained. In addition, adsorption of the second web M8 to the mesh belt 191 by static electricity can be prevented. Consequently, the second web M8 is easily detached from the mesh belt 191 at the position where the mesh belt 191 is folded back by the stretching roller 192.

Incidentally, the total amount of moisture added in the humidifying sections 231 to 236 is not particularly limited, and the moisture content of the web at the time of completion of the humidifying step, i.e., the proportion of the mass of moisture contained in the second web M8 to the mass of the second web M8 humidified in the humidifying section 236, may be 1.0 mass % or more and 30.0 mass % or less.

The humidifying step is performed at least once before the second web M8 is formed, and in the second web M8, at least part of the binder P1 is adhering to the fiber. When the humidifying step is not performed before the second web M8 is formed, a humidifying step is performed for the second web M8 in the humidifying section 236 to add moisture to the second web M8.

The formation section 20 is disposed on the downstream of the second web-forming section 19. The formation section 20 is a portion where the sheet-forming step of forming a sheet S from the second web M8, which is a mixture, is performed. This formation section 20 includes a pressurization suction 201 and a heating section 202.

The pressurization suction 201 includes a pair of calender rollers 203 and can apply a pressure to the second web M8 between the calender rollers 203 without heating. Consequently, the density of the second web M8 is increased. This second web M8 is transported toward the heating section 202. Incidentally, one of the pair of calender rollers 203 is a driving roller that is driven by the operation of a motor (not shown), and the other is a driven roller.

The heating section 202 includes a pair of heating rollers 204 and can apply a pressure to the second web M8 between the heating rollers 204 while heating the second web M8. In the second web M8, the binder absorbed water by humidification adheres to the fiber by this heating and pressurization, and the second web M8 is pressurized and heated together with the binder to bond fiber molecules to each other through the binder. Consequently, a sheet S is formed. This sheet S is transported toward the cutting section 21. Incidentally, one of the pair of heating rollers 204 is a driving roller that is driven by the operation of a motor (not shown), and the other is a driven roller.

The cutting section 21 is disposed on the downstream of the formation section 20. The cutting section 21 is a portion where the cutting step of cutting the sheet S is performed. The cutting section 21 includes a first cutter 211 and a second cutter 212.

The first cutter 211 cuts the sheet S in a direction crossing the transportation direction of the sheet S, in particular, in a direction orthogonal to the transportation direction.

The second cutter 212 cuts the sheet S in a direction parallel to the transportation direction of the sheet S on the downstream of the first cutter 211. This cutting adjusts the width of the sheet S by removing the unnecessary parts of both ends in the width direction of the sheet S, and the part that has been cut and removed is the so-called "mimi (margin)".

Such cutting with the first cutter 211 and the second cutter 212 provides a sheet S having a desired shape and size. This sheet S is further transported to the downstream and is stored in the stock section 22.

Each of these sections of the compact-manufacturing apparatus 100 is electrically coupled to the controller 28 described below, and the operation of each of the sections is controlled by the controller 28.

Suitable embodiments of the present disclosure have been described above, but the present disclosure is not limited thereto.

For example, each section constituting the compact-manufacturing apparatus that is used for manufacturing a compact can be replaced with one having any configuration that can exhibit the same function. Furthermore, an arbitrary component may be added. In addition, the method for manufacturing a compact of the present disclosure is not limited to the case of using the above-described compact-manufacturing apparatus and may use any apparatus as long as the above-described mixing step, humidifying step, and forming step are included.

3. Example and Comparative Example

The present disclosure will now be further described using Examples and Comparative Examples, but is not limited by the following Examples.

3.1. Production of Sample for Evaluation

In each example, a sheet S as a compact was manufactured using a compact-manufacturing apparatus 100 as shown in FIGURE as follows.

First, as the fiber raw material M1, a plurality of sheets of G80 (manufactured by Mitsubishi Paper Mills Limited) made of a cellulose fiber were prepared. These sheets were accommodated in the accommodation section of the sheet supply device 11, and starch or dextrin of each example was accommodated in the housing section 170 of the additive feeding section 171. Subsequently, as described above, the compact-manufacturing apparatus 100 was operated.

As a result, in the mixing section 17, the fiber and the binder were mixed at a mixing ratio of 6.0 mass % with respect to the total mass of the mixture to obtain each mixture M7.

The mixture M7 obtained in the mixing section 17 passed through the dispersion section 18 and was formed into a second web M8 containing the fiber and the binder in the second web-forming section 19.

Incidentally, humidification was performed in the humidifying section 231, the humidifying section 232, the humidifying section 233, the humidifying section 234, the humidifying section 235, and the humidifying section 236 such that the proportion of the mass of moisture contained in the second web M8 to the mass of the second web M8 in the state humidified in the humidifying section 236 was the moisture content (mass %) (water/web: mass basis) shown in Table. The moisture content was measured with a heat drying type moisture meter, MS-70, manufactured by A&D Co., Ltd.

The second web M8 was heated and pressurized in the formation section 20 to be formed into a sheet S as a long compact. The heating temperature in the formation section 20 was 80° C., the heating time was 15 seconds, and the applied pressure in the formation section 20 was 70 MPa.

The thus obtained sheet S as a long compact was cut in the cutting section 21 into a sheet of size A4.

The starch used in each example was bean-derived acid-treated starch (NSP-EA, manufactured by Nippon Starch Chemical Co., Ltd.), and the volume-based average particle diameter (D50) was adjusted by pulverizing the starch with a Nano Jetmizer. The dextrin used in each example was tapioca-derived yellow dextrin (ND-S, manufactured by Nippon Starch Chemical Co., Ltd.), and the volume-based average particle diameter (D50) was adjusted by pulverizing the dextrin with a Nano Jetmizer.

TABLE

| | Binder | Volume-based average particle diameter (μm) | Moisture content (%) | Paper strength |
|---|---|---|---|---|
| Example 1 | Starch | 10 | 60 | A |
| Example 2 | Starch | 10 | 30 | A |
| Example 3 | Starch | 10 | 15 | A |
| Example 4 | Starch | 10 | 5 | B |
| Example 5 | Starch | 20 | 60 | A |
| Example 6 | Starch | 20 | 30 | B |
| Example 7 | Starch | 20 | 15 | B |
| Example 8 | Dextrin | 10 | 30 | A |
| Example 9 | Dextrin | 10 | 15 | A |
| Example 10 | Dextrin | 20 | 30 | A |
| Example 11 | Dextrin | 20 | 15 | A |
| Reference Example 1 | Starch | 30 | 60 | A |
| Comparative Example 1 | Starch | 30 | 30 | C |
| Comparative Example 2 | Starch | 30 | 15 | C |

3.2. Evaluation

The compacts (sheets) of Examples and Comparative Examples were evaluated for the following specific tensile strength. The specific tensile strength (N·m/g) of the sheet of each example was measured with AUTOGRAP AGC-X 500N (manufactured by Shimadzu Corporation) in accordance with JIS P8113 and was evaluated as the paper strength according to the following criteria. The results are shown in Table.

A: specific tensile strength of 20.0 N·m/g or more;
B: specific tensile strength of 10.0 N·m/g or more and less than 20.0 N·m/g; and
C: specific tensile strength of less than 10.0 N·m/g.

As obvious from Table, in each of Examples in which the binder powder had an average particle diameter (D50) of 20.0 μm or less, excellent results were obtained. That is, the compact obtained in each Example could have excellent mechanical strength while securing biodegradability. It was also demonstrated that the compact of each Example could be formed with a small moisture content and could achieve sufficient mechanical strength. Furthermore, it was demonstrated from Examples 6, 7, 10, and 11 that the specific tensile strength when dextrin was used was superior to that when starch was used.

In contrast, Reference Example 1 demonstrated that even if the average particle diameter of starch was large, good specific tensile strength was obtained when the moisture content was high. However, the energy for evaporating the moisture was disadvantageously large. In addition, in Comparative Examples in which the average particle diameter exceeded 20.0 μm, although the biodegradability was considered to be good, the results were insufficient mechanical strength.

The present disclosure encompasses the substantially same configuration as the configuration described in the embodiment, for example, a configuration having the same function, method, and result or a configuration having the same purpose and effect. In addition, the present disclosure encompasses a configuration in which the non-essential portion of the configuration described in the embodiment is replaced. The present disclosure also encompasses a configuration that exhibits the same effect or achieves the same purpose as those of the configuration described in the embodiment. The present disclosure also encompasses a configuration in which a known technique is added to the configuration described in the embodiment.

The following contents are induced from the above-described embodiments and modifications.

A method for manufacturing a compact includes a mixing step of mixing a fiber and a powder of a binder to obtain a mixture; an accumulating step of accumulating the mixture to form a web; a humidifying step of adding water to the web; and a forming step of heating and pressurizing the water-added web to obtain a compact, wherein the binder binds between fiber molecules by the addition of water; and the powder has an average particle diameter (D50) of 20.0 μm or less.

In the method for manufacturing a compact, the particle may have an average particle diameter (D50) of 1.0 μm or more.

According to this method for manufacturing a compact, since the particles of the powder are small, when the binder that can bind fiber molecules by addition of moisture is supplied in a powder form to a web, the added moisture easily penetrates into the powder. Accordingly, the manufacturing of a compact through a dry process can be easily performed even with a small amount of moisture. In addition, consequently, the load on the environment can be reduced by using a natural binder, and the amount of energy that is consumed for removing moisture can be reduced.

In the method for manufacturing a compact, the binder may be selected from starch and dextrin.

According to this method for manufacturing a compact, the binder can be easily obtained, and the average particle diameter of the powder thereof can be easily adjusted.

In the method for manufacturing a compact, the humidifying step may perform humidification such that the moisture content of the web is 7.0 mass % or more and 50.0 mass % or less with respect to the total mass of the web.

According to this method for manufacturing a compact, a compact can be manufactured through a dry process with a small amount of moisture. In addition, consequently, the amount of energy that is consumed for removing moisture can be further reduced.

In the method for manufacturing a compact, the content of the binder in the web may be 1.0 mass % or more and 30.0 mass % or less with respect to the total mass of the web.

According to this method for manufacturing a compact, since the binder is contained in a sufficient amount with respect to the web, for example, transportation of the web during the manufacturing process can be stably performed.

In the method for manufacturing a compact, the temperature of heating may be 50.0° C. or more and 100.0° C. or less.

According to this method for manufacturing a compact, a compact can be manufactured by heating at a relatively low temperature compared to the case of using a known resin as a binder.

What is claimed is:

1. A method for manufacturing a compact, comprising:
   a mixing step of mixing a fiber and a powder of a binder to obtain a mixture;
   an accumulating step of making the mixture fall and accumulate on an accumulation surface to form a web on the accumulation surface;
   a humidifying step of adding water to the web such that the web has a moisture content of 7.0 mass % or more and 50.0 mass % or less with respect to the total mass of the web; and
   a forming step of pressurizing the water-added web and heating the water-added web at a temperature of 50.0° C. or more and 100.0° C. or less to obtain a compact, wherein
   the binder is starch that binds between fiber molecules by the addition of water; and
   the powder of the binder has an average particle diameter (D50) of 20.0 μm or less.

2. The method for manufacturing a compact according to claim 1, wherein the powder has an average particle diameter (D50) of 1.0 μm or more.

3. The method for manufacturing a compact according to claim 1, wherein
   a content of the binder in the web is 1.0 mass % or more and 30.0 mass % or less with respect to the total mass of the web.

4. The method for manufacturing a compact according to claim 1, further comprising
   performing a treatment on the fiber to increase hydrophilicity of the fiber.

5. The method for manufacturing a compact according to claim 4, wherein
   the treatment includes one of ultraviolet irradiation treatment, ozone treatment, and plasma treatment.

* * * * *